US008883667B2

(12) United States Patent
Nakano et al.

(10) Patent No.: US 8,883,667 B2
(45) Date of Patent: Nov. 11, 2014

(54) PURIFICATION CATALYST FOR REFLOW FURNACE GAS, METHOD FOR PREVENTING CONTAMINATION OF REFLOW FURNACE, AND REFLOW FURNACE

(75) Inventors: Yoshiki Nakano, Kanagawa (JP); Takanobu Sakurai, Kanagawa (JP); Shinichi Ueno, Kanagawa (JP)

(73) Assignee: Nikki-Universal Co., Ltd., Tokyo (JP)

( * ) Notice: Subject to any disclaimer, the term of this patent is extended or adjusted under 35 U.S.C. 154(b) by 233 days.

(21) Appl. No.: 12/445,246

(22) PCT Filed: Oct. 10, 2007

(86) PCT No.: PCT/JP2007/069745
§ 371 (c)(1),
(2), (4) Date: Apr. 10, 2009

(87) PCT Pub. No.: WO2008/047639
PCT Pub. Date: Apr. 24, 2008

(65) Prior Publication Data
US 2009/0324454 A1 Dec. 31, 2009

(30) Foreign Application Priority Data
Oct. 11, 2006 (JP) ................................ 2006-277223

(51) Int. Cl.
| | | |
|---|---|---|
| *B01J 29/06* | (2006.01) | |
| *B01J 21/06* | (2006.01) | |
| *B01J 37/02* | (2006.01) | |
| *F23G 7/07* | (2006.01) | |
| *B01J 35/00* | (2006.01) | |
| *B01J 23/42* | (2006.01) | |
| *F27D 17/00* | (2006.01) | |
| *B01D 53/86* | (2006.01) | |
| *B01J 29/068* | (2006.01) | |
| *B01J 29/44* | (2006.01) | |
| *B01J 23/40* | (2006.01) | |
| *B01J 29/40* | (2006.01) | |
| *B01J 21/12* | (2006.01) | |
| *B01J 29/08* | (2006.01) | |
| *B01J 29/70* | (2006.01) | |

(52) U.S. Cl.
CPC ........... *F27D 17/008* (2013.01); *B01J 37/0248* (2013.01); *F23G 7/07* (2013.01); *B01D 2255/2022* (2013.01); *B01J 37/0246* (2013.01); *B01J 23/40* (2013.01); *B01D 2255/50* (2013.01); *B01J 35/0006* (2013.01); *B01J 23/42* (2013.01); *B01J 29/40* (2013.01); *B01D 2255/2092* (2013.01); *B01D 2255/1021* (2013.01); *B01D 53/8668* (2013.01); *B01D 2257/2062* (2013.01); *B01J 29/068* (2013.01); *B01J 21/12* (2013.01); *B01J 29/084* (2013.01); *B01D 2251/102* (2013.01); *B01J 29/7007* (2013.01); *B01J 29/44* (2013.01)
USPC ................... 502/60; 502/63; 502/64; 502/65; 502/66; 502/69; 502/71; 502/73; 502/74; 502/77; 502/78; 502/79; 502/240; 502/242; 502/243; 502/263

(58) Field of Classification Search
USPC ........... 502/60, 63, 64, 65, 66, 71, 73, 74, 77, 502/78, 79, 240, 242, 243, 263, 69
See application file for complete search history.

(56) References Cited

U.S. PATENT DOCUMENTS

| | | | | |
|---|---|---|---|---|
| 3,329,628 A | * | 7/1967 | Gladrow et al. | 502/65 |
| 3,393,156 A | * | 7/1968 | Hansford | 502/66 |
| 3,409,390 A | * | 11/1968 | Hoekstra | 423/213.5 |
| 3,410,808 A | * | 11/1968 | Smith et al. | 502/65 |
| 3,531,396 A | * | 9/1970 | Child et al. | 208/111.15 |
| 3,558,476 A | * | 1/1971 | Robbins | 208/120.15 |
| 3,576,736 A | * | 4/1971 | Kittrell | 208/60 |
| 4,522,792 A | * | 6/1985 | Brennan | 423/213.5 |
| 5,292,991 A | * | 3/1994 | Lachman et al. | 585/850 |
| 6,143,941 A | * | 11/2000 | Sharma et al. | 585/481 |
| 6,749,655 B2 | | 6/2004 | Dautenhahn | |
| 6,881,390 B2 | * | 4/2005 | Yaluris et al. | 423/239.1 |

FOREIGN PATENT DOCUMENTS

| | | |
|---|---|---|
| JP | 03-034271 | 4/1991 |
| JP | 04-046667 | 2/1992 |
| JP | 04-371367 | 12/1992 |
| JP | 06-014589 | 1/1994 |
| JP | 06-114548 | 4/1994 |
| JP | 06-126439 | 5/1994 |
| JP | 07-204883 | 8/1995 |
| JP | 07-212028 | 8/1995 |
| JP | 10-173333 | 6/1998 |
| JP | 11-197879 | 7/1999 |
| JP | 11-216455 | 8/1999 |
| JP | 2003-324272 | 11/2003 |
| JP | 2006-202985 | 8/2006 |

OTHER PUBLICATIONS

Naoyuki Il, Kinji Ygaychi; "Analysis of Vaporized Gas From Melted Solder"; A monthly periodical: *Environment and Measurement Technology*, vol. 25, No. 4, p. 6; 1998.

* cited by examiner

*Primary Examiner* — Elizabeth Wood
(74) *Attorney, Agent, or Firm* — Fish & Richardson P.C.

(57) ABSTRACT

A purification catalyst which prevents contamination within a reflow furnace, including flux components, while suppressing the generation of CO is provided.
A purification catalyst for a reflow furnace gas, having one or two of zeolite and silica-alumina as an active ingredient.

18 Claims, 7 Drawing Sheets

PURIFICATION CATALYST FOR REFLOW FURNACE GAS, METHOD FOR PREVENTING CONTAMINATION OF REFLOW FURNACE, AND REFLOW FURNACE

TECHNICAL FIELD

This invention relates to a purification catalyst which can suppress the occurrence of CO during purification of a gas within a solder reflow furnace (a gas within a furnace will be referred to hereinafter as a furnace gas) and has a high purification efficiency; a method for preventing contamination inside a reflow furnace which method uses the catalyst; and a reflow furnace having the catalyst.

BACKGROUND ART

When soldering is performed in a reflow furnace (solder reflow), the problem arises that flux components vaporized from a solder paste become a cause of impairing the functions of a cooler for the furnace or a transporting device, or the flux components deposit on a printed circuit board, causing quality deterioration.

Concretely, the following problems with conventional reflow furnaces have been reported.

Patent Document 1 points out that a solvent in a solder paste coated on a printed circuit board in a preheating zone or a main heating zone of a reflow furnace volatilizes, or a solid component such as gum rosin vaporizes, to form a flux fume, which may deposit (as a liquid or a solid) on a relatively low temperature part, thereby impairing the functions of a cooler or a transporting device.

Patent Document 2 points out the following facts: It is difficult to remove flux completely within a heating chamber. When an inert gas containing vaporized flux passes through a narrow passage of a transport section or a board unloading section, and flows out of the furnace, the vaporized flux condenses within the board unloading section or a board discharge section and deposits on the surface of the inner wall. When operation is continued for a long time, the adhering flux drops onto the circuit board, contaminating the circuit board or an electronic component, and causing a defect such as poor performance.

Fluxes comprise vehicles, solvents, activators, and additives. Resins used as the vehicles are reported to be natural rosins (main component: abietic acid) and synthetic resins. As the activators, halogen type and non-halogen type activators are reported. As the solvents, alcohol-based solvents are reported. Concretely, there are the following reports:

Patent Document 3 reports that the resin components incorporated in the paste are natural rosin, disproportionated rosin, polymerized rosin, and modified rosin, the synthetic resins for the paste are polyester, polyurethane, and acrylic resins, the solvents for the paste are alcohol and ether, and the solvents for the paste are alcohol, ether, ester, and aromatic solvents, for example, benzyl alcohol, butanol, ethyl cellosolve, butyl cellosolve, butyl carbitol, diethylene glycol hexyl ether, and dioctyl phthalate.

Non-patent Document 1 reports that organic bromine compounds, for example, 1,2-dibromoethylene, 1,2-dibromoethylene, 1-bromo-2-methylbutane, methyl bromide, and ethylene bromide, and chlorine compounds are present as components which gasify and diffuse during a soldering operation.

Patent Document 4 makes the following report: Typical fluxes contain vehicles, solvents, activators, and other additives. The vehicles are solids or non-evaporable liquids, including rosins, resins, glycols, polyglycols, polyglycol surface active agents, and glycerin. The solvents dissolve the vehicles, activators, and other additives, and evaporate during preheating and soldering. The typical solvents include alcohols, glycols, glycol esters and/or glycol ethers. The activators produce the action of facilitating the removal of metal oxides from the surface of the metal soldered. Generally, the activators include hydrogen chloride compounds of amines; dicarboxylic acids such as adipic acid and succinic acid; and organic acids such as citric acid and maleic acid.

To cope with the above-mentioned problems, various oxidation catalysts for converting the flux components in the furnace gas into $CO_2$ and $H_2O$ have been proposed. For example, Patent Document 5 proposes a purification method which comprises causing smoke and a smelly gas generated during reflow treatment within a heating chamber to be acted on by a catalyst provided within a combustion apparatus, thereby removing them, and then refluxing smoke-free heating air within the heating chamber via a piping portion. The catalyst used in this method is an oxidizing granular catalyst such as a platinum-alumina system.

Patent Document 6 proposes a purification method in which an oxidation catalyst is installed in a circulation path for hot air, and a combustible organic gas is supplied to a heating chamber, whereby flux is oxidized and oxygen within the furnace is also consumed. This document discloses that lanthanum, cobalt-based perovskite, platinum, palladium, and rhodium are preferred as the oxidation catalyst.

Patent Document 7 describes as follows: When an oxidation reaction is performed using an oxidation catalyst, necessary oxygen is deficient unavoidably, and the reaction becomes incomplete. To make the catalyst act sufficiently, moreover, a temperature of 300° C. to 400° C. is needed. However, an appropriate temperature condition for soldering is of the order of 250° C., presenting the drawback that matching fails. Thus, this document proposes a purification method comprising providing a catalyst treatment portion charged with an oxidation catalyst outside a furnace body, connecting the catalyst treatment portion to the furnace by piping, and supplying a combustible material and oxygen to the catalyst treatment portion from the outside. The document discloses that as the catalyst, it is preferred to use a porous body formed into a three-dimensional reticulated structure, such as platinum, palladium, lanthanum or rhodium.

Patent Document 8 proposes a method in which a filter, and a catalytic reaction portion for oxidizing flux into $CO_2$, $H_2O$, etc. are provided outside a furnace, and the resulting gases are mixed, unchanged, with an atmospheric gas.

Patent Document 9 proposes a technology in which a furnace gas is passed through a porous material (straightening plate) coated with platinum, a copper-manganese based metal, or a palladium-based metal catalyst, whereby flux components in the gas are chemically combined with oxygen. By so doing, the flux components are decomposed into low molecular weight substances which minimally liquefy, and these substances are treated as an exhaust gas. By this means, flux liquefaction can be prevented, and the oxygen concentration within the furnace can be lowered.

However, even when the above-mentioned oxidation catalysts having high activity are used, the oxygen concentration within the furnace is normally of the order of 0.01 to 3%. This makes it extremely difficult to convert the flux components efficiently into $CO_2$ and $H_2O$. Thus, it is difficult to resolve contamination, etc. within the furnace due to the deposition of the flux components. With treatment with the oxidation catalyst, moreover, generation of carbon monoxide (CO) is unavoidable.

Patent Document 1:JP-A-10-173333
Patent Document 2:JP-A-2003-324272
Patent Document 3:JP-A-11-197879
Patent Document 4:U.S. Pat. No. 6,749,655
Patent Document 5:JP-A-6-14589
Patent Document 6:JP-A-4-371367
Patent Document 7:JP-A-7-204883
Patent Document 8:JP-A-7-212028
Patent Document 9:JP-A-6-114548

Non-patent Document 1: A monthly periodical "Environment and Measurement Technology", Vol. 25, No. 4, p. 6, 1998 "Handa kanetsu hassei gas no bunseki (Analysis of gas generated upon heating during soldering)".

DISCLOSURE OF THE INVENTION

Problems to be Solved by the Invention

The present invention is applied to purifying a reflow furnace gas having a low oxygen concentration. The objects of the present invention are to provide a purification catalyst which prevents contamination within a reflow furnace due to flux components in a furnace gas while suppressing the generation of CO; to provide a contamination preventing method which converts the flux components into other hydrocarbons by the purification catalyst to prevent contamination of the reflow furnace; and to provide a reflow furnace having the purification catalyst and being capable of preventing contamination within the reflow furnace.

Means for Solving the Problems

To solve the above problems, the inventors of the present invention have searched for a catalyst having the new function of converting flux components contained within a furnace into components not depositing even at low temperatures under conditions involving an oxygen-poor reflow furnace gas having an oxygen concentration of 0.01 to 3 mol % whose oxygen is incorporated unavoidably in an inert atmosphere, for example, a nitrogen atmosphere, and under temperature conditions involving a soldering temperature of 220 to 300° C. As a result, the inventors have found that a catalyst having a specific inorganic substance as an active ingredient, which is not an oxidation catalyst, can attain the objects of the present invention. This finding has led them to accomplish the present invention.

That is, the present invention lies in a purification catalyst for a reflow furnace gas, having one or two of zeolite and silica-alumina as an active ingredient.

Moreover, the present invention lies in a method for preventing contamination within a reflow furnace, characterized by bringing a reflow furnace gas into contact with the above purification catalyst having one or two of zeolite and silica-alumina as an active ingredient to crack the flux components catalytically.

Furthermore, the present invention lies in a reflow furnace provided with a purification catalyst having one or two of zeolite and silica-alumina as an active ingredient.

The term "catalytically crack" or "catalytic cracking" used herein means a cracking or decomposition reaction of a hydrocarbon using a catalyst and, more concretely, means a reaction in which the flux components contact the catalyst and convert to light hydrocarbon components (i.e., become lower in molecular weight).

The term "light hydrocarbons" as used herein refers to hydrocarbons having a boiling point of 150° C. or lower. Concretely, this term means one of, or a mixture of two or more of, saturated or unsaturated aliphatic hydrocarbons having 1 to 10 carbon atoms, more preferably 1 to 8 carbon atoms, or aromatic hydrocarbons, oxygen-containing compounds such as alcohols having 1 to 8 carbon atoms, ethers, and epoxides, and halogen-containing organic compounds such as 1,2-dibromoethylene, 1,2-dibromoethylene, 1-bromo-2-methylbutane, methyl bromide, and ethylene bromide.

Advantages of the Invention

The purification catalyst of the present invention can decompose the flux components in the gas within the reflow furnace, with sufficient efficiency, even in a furnace gas atmosphere having a low oxygen concentration within the reflow furnace, while suppressing the generation of CO, thereby preventing contamination within the furnace effectively. Concretely, the purification catalyst of the present invention catalytically cracks the flux components in the reflow furnace gas at a high rate, thereby converting them into light hydrocarbons. Thus, the purification catalyst can resolve flux-associated deposition within the furnace, which has been considered a problem, product problems due to liquefaction or deposition, and contamination of the furnace. Moreover, the purification catalyst is preferred from the aspects of environment and safety, because it causes no, or very little if any, generation of Co.

According to the contamination preventing method of the present invention, the flux components in the gas within the reflow furnace can be decomposed, with CO generation being suppressed, to prevent contamination within the furnace.

The reflow furnace of the present invention makes it possible to prevent contamination within the reflow furnace, while suppressing CO generation.

EXPLANATION OF THE REFERENCE NUMERALS

Figure 1:
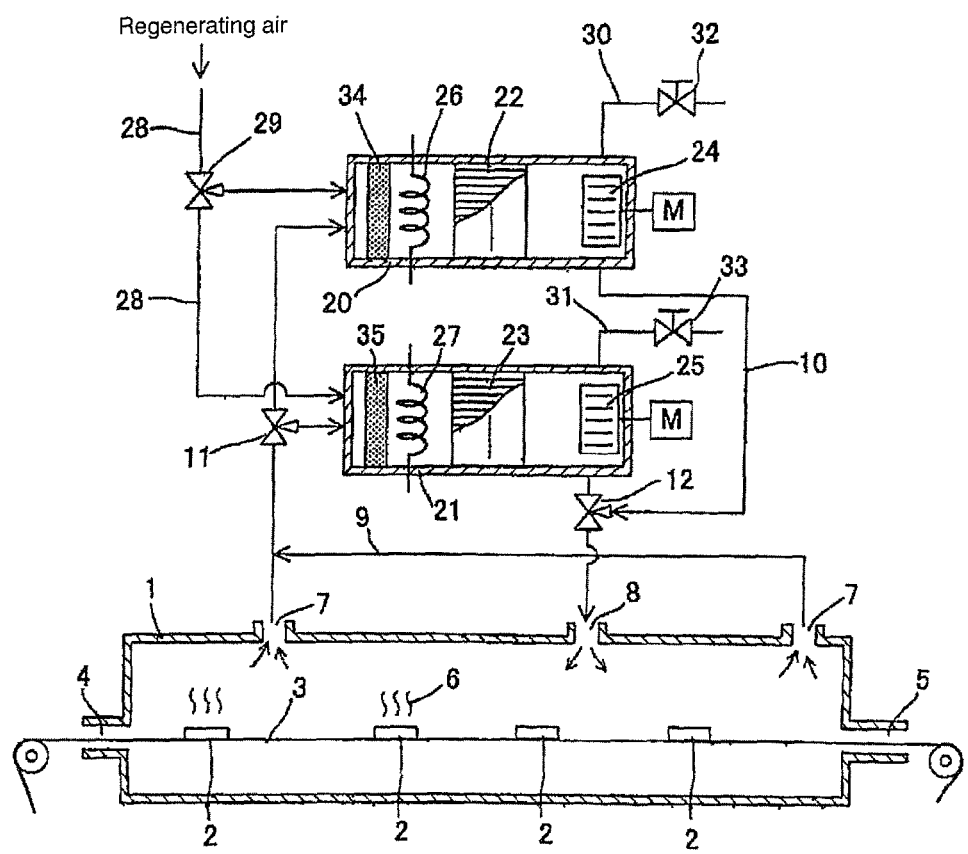
FIG. 1 is a schematic view showing the form of a reflow furnace as an embodiment of the reflow furnace of the present invention, the reflow furnace having, on the outside of the furnace, two gas purification apparatuses (A, B) mounted with the catalyst of the present invention.

1 Reflow furnace body portion
2 Printed circuit board

3 Transport means
4 Inlet
5 Outlet
6 Flux vapor
7 Furnace gas suck-out portion
8 Furnace gas return portion
9 Gas suck-out piping
10 Gas return piping
11, 12 Three-way valve
20, 21 Gas purification apparatus
22, 23 Honeycomb type catalytic cracking catalyst
24, 25 blowing fan
26, 27 Heater
28 Regenerating air introduction pipe
29 Selector valve
30, 31 Exhaust pipe
32, 33 Valve
34, 35 Filter
40 Catalytic cracking reaction apparatus
41 Reaction pipe
42 Container
43 Flux
44 Catalyst
45 Catching filter
46 Gas introduction pipe
47 Gas discharge pipe

BEST MODE FOR CARRYING OUT THE INVENTION

The present invention will be described in further detail below.

The purification catalyst of the present invention is a purification catalyst characterized by having one or two of zeolite and silica-alumina as an active ingredient, and is applied to a reflow furnace gas.

A reflow furnace is a furnace used for reflow as mentioned earlier, and is a solder reflow furnace (hereinafter, the reflow furnace refers to this reflow furnace) preferably in an atmosphere of an inert gas, for example, a nitrogen gas. A reflow furnace gas in operation contains flux components, and also has a low oxygen atmosphere inevitably incorporating 0.01 to 3 mol % of oxygen, the remainder being usually a substantially inert gas, for example, nitrogen. Thus, the interior of the reflow furnace can be said to be generally in a nitrogen atmosphere. The flux components include hydrocarbons which are a solvent and an activator evaporating from a flux, and gaseous or fumy (smoky) hydrocarbons generated upon thermal decomposition of resin. Concrete examples of the flux components are alcohols, glycols, glycol esters, glycol ethers; dicarboxylic acids such as adipic acid and succinic acid; and organic acids such as citric acid and maleic acid.

The purification catalyst of the present invention is applied to preventing contamination by such a reflow furnace gas in a nitrogen atmosphere which has a low oxygen concentration and contains the flux components.

The purification catalyst of the present invention will be described in detail below.

The catalyst of the present invention is a catalyst having the function of catalytically cracking the flux components. It is a catalyst containing one or two of zeolite and/or silica-alumina, and acting to crack the flux components catalytically, thereby converting them into light hydrocarbons. Thus, this catalyst differs from publicly known oxidation catalysts. The catalyst of the present invention is used in forms carried on various substrates, such as a particulate molded article, a honeycomb, and a foam metal.

(Main Active Ingredient)

The purification catalyst of the present invention contains one or two of zeolite and/or silica-alumina as a main active ingredient.

Zeolite:

The zeolite used in the present invention may be a natural product or a synthetic product. Examples of the naturally occurring zeolite are mordenite, erionite, ferrierite, and schapbachite. Examples of the synthetic product are A type zeolite; Y type zeolite; MFI type zeolite such as ZSM-5; and β type zeolite. Of these zeolites, any of Y type, MFI type, β type, and mordenite is preferred. Further, the zeolite having a silica/alumina (i.e., constituents of these zeolites) molar ratio ($SiO_2/Al_2O_3$ molar ratio) of 3 or higher, preferably 5 to 100, more preferably 3 to 50, further preferably 5 to 50, is preferred for preventing contamination, since it has excellent activity of decomposing the flux components.

The zeolite used in the present invention may be of a proton type, or of a metal-substituted type (including ammonium-substituted type) to be mentioned below. A mixture of the proton type zeolite and the metal-substituted type zeolite may be used. The proton type zeolite refers to zeolite in which at least a part of the ion exchangeable cation site is occupied by $H+$. For example, the proton type of the Y type zeolite is designated as H—Y, the proton type of mordenite is designated as H-mordenite, the proton type of ZSM-5 as an example of the MFI type zeolite is designated as H-ZSM5, and the proton type of the β type zeolite is designated as H-β. Any of these H type zeolites is used particularly preferably as a catalytic component of the present invention.

The metal-substituted type zeolite refers to zeolite in which at least a part of the ion exchangeable cation site is occupied by metal cations (including ammonium ion substitution). Examples of the metal-substituted type zeolite are zeolites substituted by alkali metals such as Na; alkaline earth metals such as Ca; Group 3 metals such as La (lanthanum); Group 8 metals such as Fe; Group 9 metals such as Co and Rh; Group 10 metals such as Ni and Pd; and Group 11 metals such as Cu and Ag. For example, the Y type zeolite having the cation site occupied by Fe cations is designated as Fe—Y type zeolite, and the other zeolites are also designated similarly. Zeolites as a whole, which have been substituted by Fe cations, are designated as Fe-zeolites. Each of these metal-substituted types of the Y type, MFI type, ZSM type, β type and mordenite zeolites is also preferred as the catalytic component of the present invention.

Silica-Alumina:

The silica-alumina used in the present invention is obtained by a publicly known method. It is a porous amorphous substance, or a substance containing the porous amorphous substance. Such a substance has so far been used for various catalytic carriers, and is commercially available. For example, the products of UOP under the commercial names "SAB-6", "SAB-10", "SAE-12" or their equivalents (products having the same component composition and/or structure as any of these commodities) can be preferably used.

As the active ingredient in the present invention, both of zeolite and silica-alumina can also be mixed and used. In this case, the blend ratio between zeolite and silica-alumina is preferably set at 99:1 to 1:99 (weight ratio).

(Other Components)

Noble or Precious Metal:

The purification catalyst of the present invention may contain, in addition to the above-mentioned main active ingredient, one or more precious metals selected from Pt, Pd, Rh, Ir, Ru and their alloys in a proportion of 10 ppm by weight to 2% by weight, preferably 50 ppm by weight to 2% by weight, more preferably 100 ppm by weight to 2% by weight, particularly preferably 0.1% by weight to 2% by weight, based on the total weight of the above main ingredient.

The catalyst of the present invention containing the precious metal component catalytically cracks the flux components efficiently, and lowers the concentration of light hydrocarbons contained in the cracked gas. The catalyst also decrease the concentration of CO more effectively, and thus can prevent contamination within the furnace more effectively. Further, a decline in the cracking activity of the catalyst can be suppressed. If the content of the precious metal component is less than 10 ppm by weight, these effects may fail to be sufficiently exhibited. If the content of the precious metal component exceeds 2% by weight, on the other hand, the generation of CO may increase. Thus, the content within the above-mentioned concentration ranges is preferred.

The above precious metal can also be carried on particles of zeolite or silica-alumina as the main active ingredient.

Another embodiment of the purification catalyst of the present invention is a catalyst containing one or two of the above-mentioned zeolite and silica-alumina (hereinafter, these substances will be referred to as component A) and one or more of inorganic oxides such as alumina ($Al_2O_3$), zirconia ($ZrO_2$), titania ($TiO_2$), titania-alumina ($TiO_2 \cdot Al_2O_3$), silica-zirconia ($SiO_2 \cdot ZrO_2$), and ceria ($CeO_2$) (hereinafter, these substances will be referred to as component B) at a component A:component B ratio (weight ratio) of 99:1 to 10:90, preferably 90:10 to 20:80, more preferably 90:10 to 30:70, particularly preferably 90:10 to 40:60, and further containing one or more of the precious metals in a proportion of 10 ppm by weight to 2% by weight, preferably 50 ppm by weight to 2% by weight, more preferably 100 ppm by weight to 2% by weight, particularly preferably 0.1% by weight to 2% by weight, based on the total weight of the component A and the component B.

By combining the component A and the component B in the above ranges and incorporating the precious metal in the above ranges into the combination, the effects are obtained that in comparison with the catalyst comprising the component A alone, catalytic cracking reaction activity (conversion rate) is further increased, the effect of preventing contamination within the furnace is upgraded, the persistence of the catalytic cracking activity of the catalyst is increased, and further the amount of generation of light hydrocarbons is decreased. These effects are exhibited further effectively when the ratio (weight ratio) of the component A to the component B is 90:10 to 20:80, preferably 90:10 to 30:70, and more preferably 90:10 to 40:60, and the content of the precious metal is 50 ppm by weight to 2% by weight, more preferably 100 ppm by weight to 2% by weight, particularly preferably 0.1% by weight to 2% by weight.

Here, a catalyst composition comprising inorganic oxide particles (component B), such as alumina, which bear 0.1% by weight to 5% by weight of the above precious metal, mixed with the above zeolite or silica-alumina particles (component A) is one of preferred modes. That is, a catalyst composition, for example, comprising a mixture of the H—Y zeolite particles (component A) and alumina particles (component B) carrying 0.1% by weight to 5W by weight of one or more of the precious metals Pt, Pd, Rh, Ir and Ru, at the component A:component B ratio (weight ratio) of 90:10 to 20:80, preferably 90:10 to 30:70, more preferably 90:10 to 40:60, and containing 100 ppm by weight to 2% by weight of the precious metal (based on the total weight of the component A and the component B) is illustrated as a preferred catalyst. Instead of the H—Y zeolite, the Na—Y zeolite, the H-mordenite, the H-ZSM5, or the H-β type zeolite may be used.

Still another embodiment of the purification catalyst of the present invention is a catalyst containing, in addition to the above-mentioned component A, at least one element among alkali metals such as sodium (Na), potassium (K), lithium (Li) and cesium (Cs), and alkaline earth metals such as barium (Ba), calcium (Ca), and magnesium (Mg) (hereinafter, these elements will be referred to as "alkali/alkaline earth metal elements"), as a metal content, in a proportion of 1 to 10% by weight, preferably 2 to 8% by weight, more preferably 3 to 6% by weight, based on the component A.

Yet another embodiment of the purification catalyst of the present invention is a catalyst containing, in addition to the above-mentioned component A (component B may also be included) and one or more of the aforementioned precious metals, at least one of the alkali/alkaline earth metal elements, as a metal content, in a proportion of 1 to 10% by weight, preferably 2 to 8% by weight, more preferably 3 to 6% by weight, based on the component A.

Any of these alkali metal elements is present in the form of an oxide, or an alloy or compound with the precious metal, together with the component A or both the component A and the component B, in the catalyst. The catalyst containing the alkali/alkaline earth metal element in the above-mentioned content range shows the effects of cracking the flux components to an even higher degree, suppressing the deposition of coky hydrocarbons on the catalyst, and suppressing the formation of CO. The alkali/alkaline earth metal element content of not more than 1% by weight does not show the effect of further increasing the cracking rate of the flux components. On the other hand, the alkali/alkaline earth metal element content of not less than 10% by weight poses the problem of decreasing the flux cracking rate.

Examples of the method for producing the catalyst containing the alkali/alkaline earth metal element are as follows:

Example 1: A method which comprises charging an oxide (e.g., $K_2O$), a nitrate (e.g., $KNO_3$), a carbonate (e.g., $MgCO_3$) or an acetate (e.g., $CH_3COONa$) of the alkali/alkaline earth metal element, as a solid or an aqueous solution, together with the component A or both of the component A and the component B, to prepare a slurry, coating a substrate with the slurry by a method to be described below, then carrying a precious metal on the coated substrate, and then firing the carried substrate at 400 to 550° C. to carry a catalyst layer on the substrate.

Example 2: A method which comprises carrying a catalyst layer containing the component A or both of the component A and the component B, as well as a precious metal, on a substrate, then impregnating the catalyst layer with an aqueous solution of potassium nitrate, and firing the impregnated catalyst layer at 400 to 550° C.

Additionally, the catalyst of the present invention does not exclude containing a binder component to be described later and other components, as long as they do not inhibit a catalytic function.

(Actions of Catalyst)

The purification catalyst of the present invention has an action based on a hitherto unknown technical idea, i.e., the work of performing a catalytic cracking reaction at a soldering temperature of 220 300° C. even under atmospheric conditions within a reflow furnace, namely, in a low oxygen concentration state, for example, in a nitrogen atmosphere, thereby converting the flux components into light hydrocarbons.

(Method for Preparing catalyst)

Molded Catalyst:

When applied to an actual reflow furnace, the catalyst of the present invention is used after processing into suitable forms, such as those for various catalyst substrates or particulate molded articles, in consideration of the flow of a furnace gas, the amount of the gas, the treatment speed, or limitations on the place of installation within the furnace. Examples of the preferred substrate are a honeycomb, a sheet, a mesh, a pipe, a filter, a punching metal, and a foam metal. The material for the substrate is not limited, and cordierite, alumina, carbon fiber, metal fiber, glass fiber, ceramic fiber, stainless steel, and a metal such as titanium are named. Advisably, the catalyst composition of the present invention is carried, as a catalyst layer, on the surface of the substrate.

The method of carrying the catalyst layer on the substrate is, for example, as follows: The substrate of an arbitrary shape is readied for use. Then, the catalyst is coated on the substrate by a publicly known method, for example, impregnation or spraying using a slurry containing catalyst particles and a binder. The coated substrate is dried, and then fired at a temperature of 150 to 350° C. to prepare a catalyst layer carried on the substrate.

Binder Component:

Examples of a binder component used to form molded particles or a honeycomb are publicly known binder components, such as colloidal silica, alumina sol, silica gel, boehmite, and zirconia sol. The amount of such a binder component used may be a preferred proportion selected, as appropriate, from the range of 5 to 20% by weight based on the total weight of the aforementioned main active ingredients.

Another mode of use may be processing into molded particles having an average particle size of 0.5 mm to 10 mm, such as spheres, pellets or granules, and these particles may be charged into a catalyst reactor or a filter cloth and used.

Still another mode may be as follows: One or more types among zeolite particles, silica-alumina particles, and FCC catalyst particles (crystalline silica-alumina) used in the petroleum refining industry are readied for use. These particles may be bound in a matrix form with the use of alumina sol or porous alumina silicate hydrate, if necessary, with the addition of kaolin or the like, and the resulting composition shaped like a porous film or sheet is used.

Honeycomb, Catalyst Layer:

No special limitations are imposed on the average thickness of the catalyst layer. From the aspects of the catalytic cracking reaction and the life of the catalyst, the average thickness is 10 μm or more, preferably 20 μm or more, but 500 μm or less, preferably 300 μm or less. If the thickness of the catalyst layer is less than the above ranges, the cracking rate of the flux components may be insufficient. If the thickness of the catalyst layer exceeds the above ranges, the exhaust gas does not fully diffuse into the catalyst layer, so that a portion not contributing to the cracking reaction tends to form in the catalyst layer. Thus, the thickness within the above ranges is preferred.

No special limitations are imposed on the particle size of the zeolite or silica-alumina particles used in the present invention, and the particle size of the inorganic particles added where necessary, such as alumina. It is preferred, however, that these particles have an average particle size of 0.1 μm to 1 mm, preferably 1 μm to 0.1 mm. For example, zeolite particles or silica-alumina particles are coated in a slurry state on the surface of a substrate such as a honeycomb or a spherical carrier, together with the binder component, to form a film, and this film is used. In this case, it is appropriate to use inorganic particles having a size suitable for slurry formation, for example, an average particle size of 0.1 μm to 200 μm, preferably 0.1 to 100 μm.

(Method for Preventing Contamination)

The method for preventing contamination of a reflow furnace according to the present invention is characterized by bringing a reflow furnace gas, which has an oxygen concentration of 0.01 to 3 mol % and contains flux components in a generally inert gas atmosphere, for example, in a nitrogen atmosphere, into contact with the purification catalyst of the present invention, to crack the flux components catalytically.

That is, the method for preventing contamination according to the present invention is characterized by performing a catalytic cracking step of cracking the flux components in the reflow furnace gas of the above-mentioned oxygen concentration, which conventional oxidation catalysts have been unable to purify sufficiently, thereby converting the flux components into light hydrocarbons.

The temperature conditions for the catalytic cracking can be the furnace temperature or a temperature higher than it, namely, the soldering temperature of 220 to 300° C. if the catalyst is installed within the furnace; or the soldering temperature or a higher temperature than it, for example, a temperature of 250 to 350° C. if the catalyst is installed outside the furnace.

In the method for preventing contamination according to the present invention, moreover, a regeneration step for restoring the catalytic cracking function of the purification catalyst can be provided subsequently to the above catalytic cracking step. In the regeneration step, the catalyst having catalytically cracked the furnace gas is heated at a temperature suitable for burning off carbon or carbonaceous hydrocarbons deposited in the catalyst, for example, 250 to 350° C., in an oxygen atmosphere such as air, thereby burning off coky hydrocarbon components deposited during the catalytic cracking reaction, thus successfully restoring the activity.

When the purification catalyst is mounted within the furnace, the regeneration step may heat the catalyst in air as a furnace atmosphere before start of operation of the furnace or at completion of the operation, or may dismount the catalyst, mount the catalyst on a separately provided catalyst regeneration apparatus, and heat it under similar conditions. When the purification catalyst is mounted outside the furnace, a plurality of purification apparatuses mounted with the catalyst are connected to the furnace in parallel, whereby the regeneration step can be performed even during the operation of the furnace, as well as before start of operation of the furnace or at completion of the operation.

(Reflow Furnace Mounted with Catalyst)

Next, the reflow furnace of the present invention will be described.

Reflow Furnace:

The catalyst of the present invention is mounted in the interior of the reflow furnace or on the outside of the furnace, and is subjected to catalytic cracking of the flux components contained in an atmospheric gas. For installation within the furnace, it is recommendable to install a plurality of honeycomb-shaped catalysts in a preheating zone and a reflow zone, and feed a furnace gas to the catalysts by a fan. Alternatively, a sheet-shaped catalytic cracking catalyst may be installed along a top board or a furnace wall within a furnace body.

FIG. 1 shows a reflow furnace having, on the outside of the furnace, two gas purification apparatuses (A, B) mounted with the catalyst of the present invention, for rendering the purification of the furnace gas and the regeneration of the catalyst (block operation) possible at the same time.

Based on FIG. 1, the configuration and actions of the reflow furnace of the present invention will be described below.

Two gas purification apparatuses A (20) and B (21) are connected to a reflow furnace body portion 1, which is designed to perform soldering, by a gas suck-out piping 9 via a furnace gas suck-out portion 7 and by a gas return piping 10 via a furnace gas return portion 8. In this manner, a reflow furnace is configured. Honeycomb type catalytic cracking catalysts 22 and 23 are mounted in the gas purification apparatuses A and B, respectively. The gas purification apparatuses are also equipped with other members, including filters 34, 35 for removing mist and solids contained in a gas, heaters 26, 27 for the temperature control of the gas, and blowing fans 24, 25 coupled to motors (M) for controlling the flow of the gas. A regenerating air introduction pipe 28 is mounted on the gas purification apparatuses A, B, and regenerating air is introduced from the outside via a three-way valve 29, while an exhaust gas is discharged through exhaust pipes A, B (30, 31).

Actions:

The actions of the reflow furnace will be described below, with the purification of the reflow furnace gas performed in the gas purification apparatus A (20) and the regeneration of the catalyst simultaneously performed in the apparatus B (21) being taken as an example. It goes without saying that the reverse of the roles of these apparatuses is also possible. A printed circuit board 2 with a paste, which has been carried in from an inlet 4 by a transport means 3 within the reflow furnace body portion 1, is heated within the furnace, whereby a flux vapor 6 spreads into an atmospheric gas. The atmospheric gas containing the flux components is passed through the gas suck-out piping 9 from the furnace gas suc-out portion 7, and introduced into the gas purification apparatus A (20) via a three-way valve 11. On this occasion, regenerating air is not introduced into the gas purification apparatus A by controlling a selector valve 29. The gas introduced into the apparatus A is controlled by the heater 26 to a temperature suitable for a catalytic cracking reaction, for example, 250 to 300° C., and is then brought into contact with the catalyst 22. Thus, the flux components contained in the gas are catalytically cracked. As a result of flux cracking, the resulting cracked gas is returned into the reflow furnace body portion 1 via the gas return piping 10, a three-way valve 12, and the gas return portion B.

In the gas purification apparatus B, on the other hand, the step of regenerating the catalyst having its cracking activity lowered as a result of catalytic cracking is carried out. Regenerating air is introduced through the regenerating air introduction pipe 28 into the gas purification apparatus B via the selector valve 29. This air is controlled by the heater 27 to a temperature necessary for regeneration, for example, 250 to 350° C., and is then brought into contact with the catalyst 23 to burn coky hydrocarbon components deposited on the catalyst, thereby restoring catalytic cracking activity. An exhaust gas generated by combustion is discharged through the exhaust pipe 31 via a valve 33. This regenerating operation can be performed even during soldering work or during maintenance work for the furnace. The catalyst 23 which has finished regeneration is subjected again to a catalytic cracking reaction.

In addition to the above operational example, the two gas purification apparatuses A and B may be simultaneously used for a catalytic cracking reaction. With the reflow furnace having the catalysts provided exteriorly, the temperature of the catalysts can be set at a higher temperature than that in installation within the furnace, so that the catalytic cracking reaction can be promoted. Moreover, air can be introduced through piping separately provided. Thus, regeneration of the catalyst is easy.

EXAMPLES

The present invention will be described in more detail based on the following Examples, but the present invention is not limited to these examples:

Preparation of Catalyst

Catalyst A: $Pt/Al_2O_3$ (100):

An acidic aqueous solution of dinitrodiaminoplatinum was added to a γ-alumina powder (a product of Nikki-Universal Co., Ltd., average particle diameter 5 μm), and then the mixture was evaporated to dryness. Then, the resulting solid was fired for 2 hours at 500° C. to obtain Pt-carried alumina particles (designated as $Pt/Al_2O_3$ particles). The amount of Pt carried (weight of Pt/weight of γ-alumina shown in %) was 1.5% by weight.

The resulting $Pt/Al_2O_3$ particles (200 g) and 50 g of boehmite as a binder were mixed, and 25 g of this mixture was added to a mixture of 60% nitric acid and 725 g of ion-exchanged water to form a slurry. This slurry was coated on a cordierite honeycomb (produced by NGK Insulators, Ltd., 200 cells/square inch), as a substrate, by the wash coat process. The excess slurry was blown away by compressed air, and dried in a dryer for 3 hours at 150° C. Then, the coated substrate was fired in air for 2 hours at 500° C., and then heated in a hydrogen atmosphere for 1 hour at 500° C. to obtain a catalyst A having a catalyst layer of $Pt/Al_2O_3$ formed on the honeycomb substrate. The weight of the catalyst layer per liter of the honeycomb was 50 g (excluding the binder).

Catalyst B: $Al_2O_3$ (100):

A catalyst B having an alumina catalyst layer carried on a honeycomb carrier was obtained in the same manner as for the catalyst A, except that the above $Al_2O_3$ was used instead of $Pt/Al_2O_3$ used for the catalyst A.

Catalyst 1: H—Y (100):

A catalyst 1 having an H—Y zeolite catalyst layer carried on a honeycomb carrier was obtained in the same manner as for the catalyst A, except that an H—Y type zeolite powder (a product of UOP under the commercial name LZY85, average particle size 2 μm, $SiO_2/Al_2O_3$ molar ratio 5.9) was used instead of $Pt/Al_2O_3$ used for the catalyst A, and silica sol was used instead of boehmite as a binder.

Catalyst 2: ZSM5 (100):

A catalyst 2 having a ZSM type zeolite catalyst layer carried on a honeycomb carrier was obtained in the same manner as for the catalyst A, except that an H-ZSM5 zeolite powder (a product of UOP, average particle size 2 μm, $SiO_2/Al_2O_3$ molar ratio 40) was used instead of $Pt/Al_2O_3$ used for the catalyst A, and silica sol was used instead of boehmite as a binder.

Catalyst 3: β type zeolite (100):

A catalyst 3 having a β type zeolite catalyst layer carried on a honeycomb carrier was obtained in the same manner as for the catalyst A, except that a β type zeolite powder (a product of UOP, average particle size 2 μm, $SiO_2/Al_2O_3$ molar ratio 25) was used instead of $Pt/Al_2O_3$ used for the catalyst A, and silica sol was used instead of boehmite as a binder.

Catalyst 4: H—Y (50)+$Al_2O_3$ (50):

The above-mentioned H—Y zeolite (100 g), 100 g of the $Al_2O_3$ powder used in the aforementioned catalyst A, and 50 g of boehmite as a binder were mixed, and 25 g of this mixture was added to a mixture of 60% nitric acid and 725 g of ion-exchanged water to form a slurry. Subsequently, the same procedure as for the catalyst A was performed under the same conditions to obtain a catalyst 4 having a catalyst layer of the composition H—Y (50)+$Al_2O_3$ (50) formed on a honeycomb carrier.

Catalyst 5: H—Y (50)+Pt/Al$_2$O$_3$ (50):

A catalyst 5 having a catalyst layer of the composition H—Y (50)+Pt/Al$_2$O$_3$ (50) carried on a honeycomb carrier was obtained in the same manner as for the catalyst 4, except that 100 g of the above H—Y zeolite and 100 g of the Pt-carried alumina particles (Pt/Al$_2$O$_3$) of the catalyst A were mixed and used. The Pt content of this catalyst was 0.75% by weight.

Catalyst 6: H—Y (80)+Pt/Al$_2$O$_3$ (20):

A catalyst 6 having a catalyst layer of the composition H—Y (80)+Pt/Al$_2$O$_3$ (20) carried on a honeycomb carrier was obtained in the same manner as for the catalyst 4, except that 160 g of the above H—Y zeolite and 400 g of the Pt-carried alumina particles (Pt/Al$_2$O$_3$) of the catalyst A were mixed and used. The Pt content of this catalyst was 0.3% by weight.

Catalyst 7: Pt/ZSM5 (100):

An acidic aqueous solution of dinitrodiaminoplatinum nitric acid was added to the aforementioned H-ZSM5 zeolite powder (a product of UOP, average particle diameter 2 µm, SiO$_2$/Al$_2$O$_3$ molar ratio 40) so that the amount of Pt carried would be 0.5% by weight. The mixture was heated in an evaporating dish, and evaporated to dryness. Then, the resulting solid was fired for 2 hours at 500° C. to obtain Pt-carried ZSM5 type zeolite particles. A catalyst 7 having a Pt/ZSM5 (100) catalyst layer carried on a honeycomb carrier was obtained in the same manner as for the catalyst A, except that the zeolite powder was used, and silica sol was used instead of boehmite as a binder.

Catalyst 8: H—Y (50)+Pt/Al$_2$O$_3$ (50)+K (5):

An aqueous solution of potassium nitrate was added to 100 g of the aforementioned Pt-carried alumina particles (Pt/Al$_2$O$_3$) of the catalyst A. Then, the mixture was evaporated to dryness to obtain Pt-carried alumina particles containing potassium (K) (K—Pt/Al$_2$O$_3$). Then, the particles were fired for 2 hours at 500° C. to obtain K-carried Pt alumina particles. The amount of K carried (weight of K/weight of Pt alumina shown in %) was 5% by weight. A catalyst 8 having a catalyst layer of the composition H—Y (50)+K+Pt/Al$_2$O$_3$ (50) carried on a honeycomb carrier was obtained in the same manner as for the catalyst 5, except that 100 g of the above H—Y zeolite and 100 g of the K+Pt/Al$_2$O$_3$ were mixed and used.

Cracking Activity Evaluation Apparatus

Figure 2:
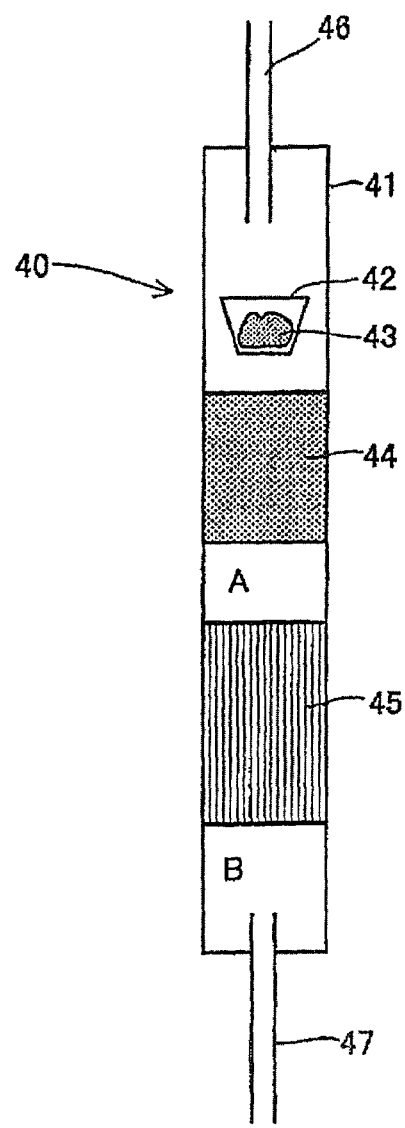
FIG. 2 is a schematic view of a catalytic cracking reaction apparatus prepared to confirm the performance of a purification catalyst.

Each of the resulting catalysts was evaluated for the property of cracking the flux components and the tendency toward formation of the cracked gas with the use of a flow-through type reaction apparatus shown in FIG. 2.

First of all, a reaction apparatus 40 shown in FIG. 2 is described. A container 42 made of aluminum for placing flux components 43, a honeycomb type catalyst 44 in the shape of a cylinder (diameter 21 mm, length 50 mm), and a catching filter 45 formed of glass fibers for catching uncracked flux components contained in a cracked gas A having passed through the catalyst 44 are provided inside a reaction pipe 41. A gas introduction pipe 46 for introducing a nitrogen gas (may be referred to hereinafter as a carrier gas) containing oxygen (0.1%) is provided at one end of the reaction pipe 41, whereas a gas discharge pipe 47 having a gas collection bag (not shown) attached thereto is provided at the other end of the reaction pipe 41.

In the descriptions presented below, the cracked gas, unless otherwise specified, refers to a gas obtained when the flux components are brought into contact with the catalyst for catalytic cracking (the gas present in a portion A in the drawing). Concretely, the cracked gas includes light hydrocarbons generated by cracking, uncracked flux components, CO, CO$_2$ and H$_2$O. In the descriptions made below, the gas immediately after treatment with the catalyst may be expressed as "cracked gas A" in order to avoid confusion. Then, the cracked gas A passes through the catching filter 45 and, at this time, the uncracked flux components contained are adsorbed to the filter, and removed thereby. The cracked gas after passage through the catching filter (the gas present in a portion B in the drawing) may be expressed as "cracked gas B".

The above-mentioned carrier gas is representative of the actual atmosphere within the reflow furnace. Thus, the present apparatus can measure the flux cracking activity of the catalyst under this atmosphere. With the catalyst having a high flux cracking rate, the amount of the uncracked flux components in the cracked gas A is small, thus meaning that contamination within the furnace can be prevented.

Reaction Procedure

The container 42 is charged with 0.10 g of flux (produced by Asahi Chemical Research Laboratory CO., LTD., commercial name "Speedy Flux"), and the reaction pipe is heated at a temperature from room temperature up to 250° C., with the temperature rising at a rate of 5° C. per minute. Then, the carrier gas is introduced from the gas introduction pipe 46 for 10 minutes at a rate of 2.0 liters/minute. The flux components which evaporate are brought into contact with the catalyst together with the carrier gas to perform a catalytic reaction at 250° C. and a space velocity (SV) of 7000 hr$^{-1}$. Each time one cycle is completed, the flux 43 and the catching filter 45 are replaced by new ones so that the reaction procedure for a next cycle is performed. This operation is taken as one cycle.

Evaluation and Measurement Items

Measurement of light hydrocarbons in cracked gas B:

Apparatus: Gas chromatograph (GC14-A produced by Shimadzu Corp., detector: FID)

Column: Gaskuropack 54

Column temperature: 170° C., injection temperature: 200° C., detector temperature: 200° C.

Carrier gas: Nitrogen gas 35 ml/min

CO measurement: Electrolytic CO analyzer

CO$_2$ measurement: Methanated FID type analyzer

Example 1

The fact of catalytic cracking was confirmed in the following manner:

Comparative Example

No Catalyst

In the apparatus 40 of FIG. 2, a honeycomb carrier formed of cordierite (having no catalytic component carried thereon) was mounted at the position of the catalyst 44, and a flux sample was charged into the container 42. In this state, a catalytic cracking reaction was performed under the aforementioned conditions. A gas chromatographic analysis chart of a hydrocarbon composition in the cracked gas B is shown in FIG. 3A.

Figure 3A:
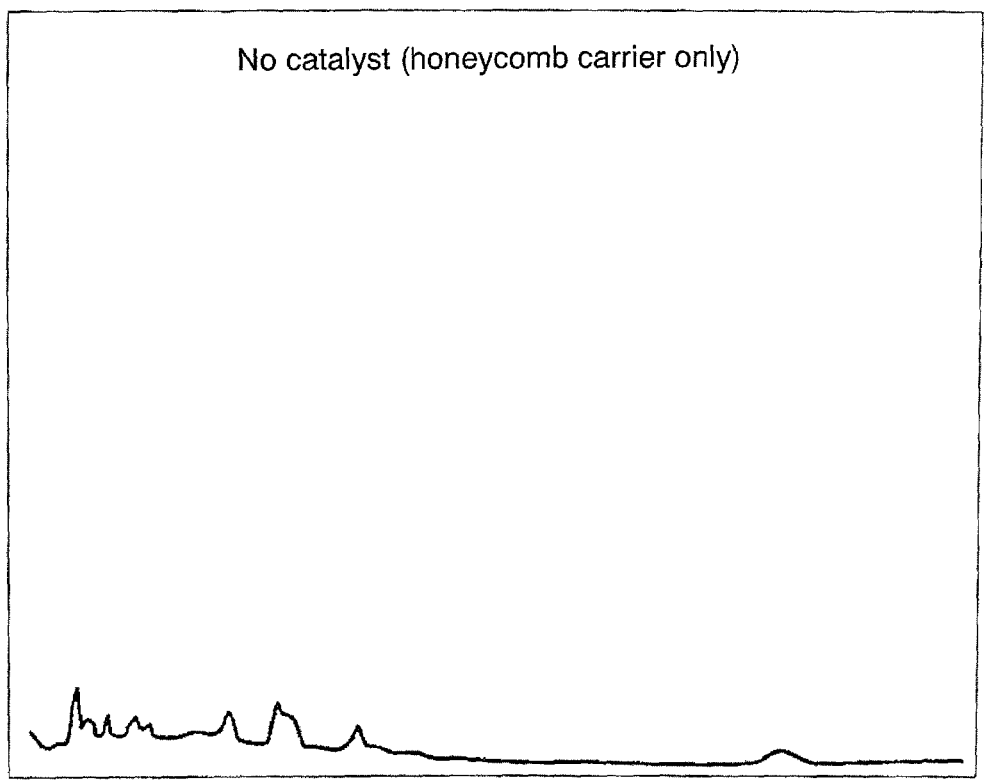
FIG. 3A is a gas chromatography chart for confirming a reaction state when the apparatus shown in FIG. 2 is provided only with a catalyst-free substrate.

As shown in FIG. 3A, several tiny peaks were observed, and the total content corresponding to them (calculated as methane CH$_4$) was 1.0 ppm. CO (carbon monoxide) in the cracked gas was in an amount of its detection limit or less (5 ppm or less).

Comparative Example

Pt/Al$_2$O$_3$ Catalyst

The aforementioned catalyst A (Pt/Al$_2$O$_3$ (100)) was mounted in the apparatus 40 of FIG. 2, and the same operation was performed. A gas chromatographic analysis chart of the cracked gas after treatment with the catalyst is shown in FIG. 3B.

Figure 3B:
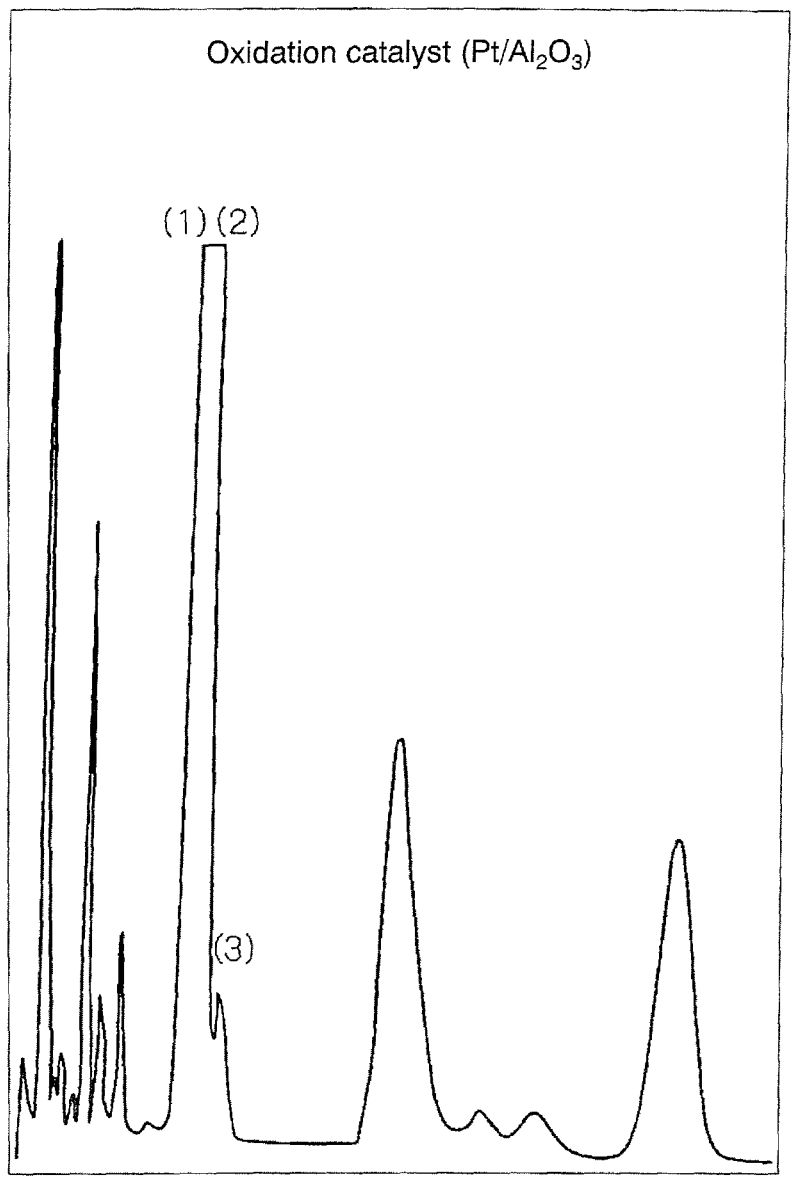
FIG. 3B is a gas chromatography chart for confirming a reaction state when the apparatus shown in FIG. 2 is provided with a catalyst A.

Calculations from the peaks in FIG. 3B show that the flux components were converted by the precious metal catalyst into light hydrocarbon components amounting to 110 ppm (calculated as methane). Of these peaks, the three peaks (peaks (1), (2) and (3) in the drawing) appearing at retention times of 4.7 to 5.7 minutes accounted for 48% of the total. The content of CO (carbon monoxide) in the cracked gas was 15 ppm, and the content of $CO_2$ (carbon dioxide gas) was 125 ppm. These findings show that the precious metal catalyst acts as an oxidation catalyst even in a nitrogen gas atmosphere containing 0.1 mol % of oxygen (calculated as methane), whereby the flux components are subjected to partial oxidation and cracking reaction at 250° C. to generate CO.

(Catalyst of Present Invention: H—Y Catalyst)

The aforementioned catalyst 1 was mounted, and the same operation was performed. A gas chromatographic analysis chart of the gas after treatment with the catalyst is shown in FIG. 3C.

Figure 3C:
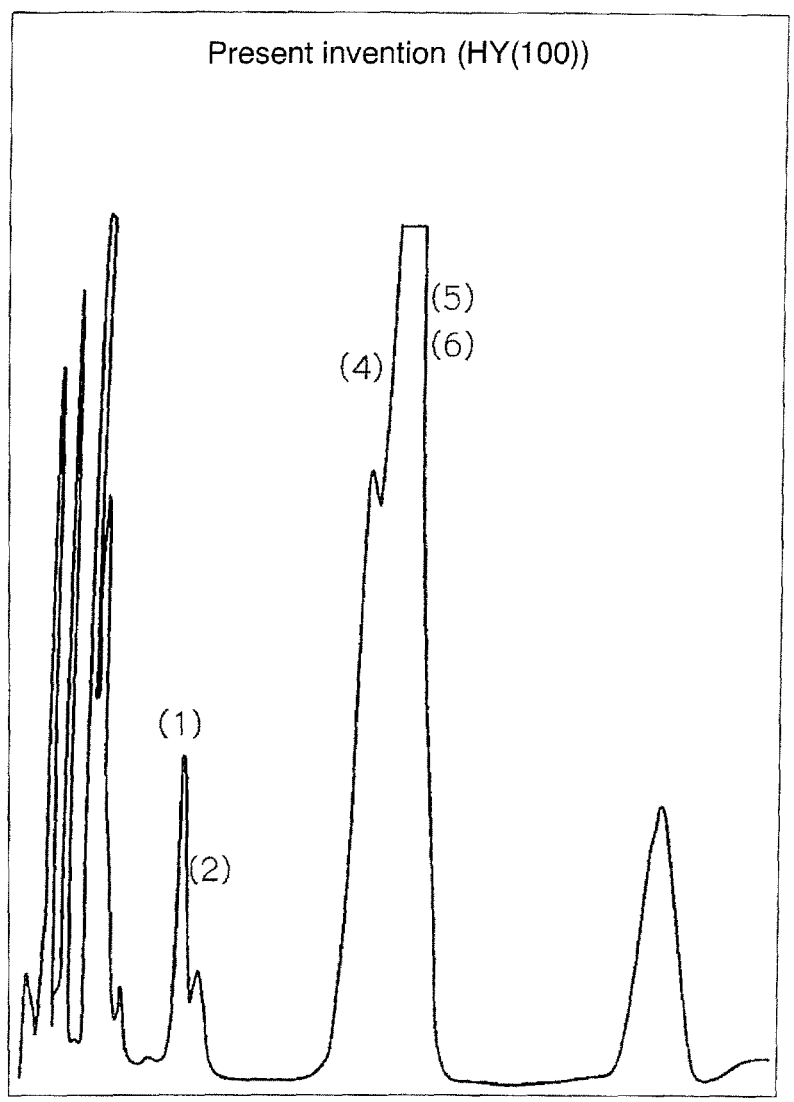
FIG. 3C is a gas chromatography chart for confirming a reaction state when the apparatus shown in FIG. 2 is provided with a catalyst 1.

Calculations from the peaks in FIG. 3C show that the flux components were converted by the zeolite-based catalyst into light hydrocarbon components amounting to 130 ppm (calculated as methane). Of these components, the components at retention times of 4.6 to 5.7 minutes (components (1) and (2) in the drawing; both were alcohol) were contained in a proportion of 5.0 mol % (calculated as methane) based on the total. Further, the components at retention times of 9.7 to 10.6 minutes (peaks (4), (5) and (6) in the drawing; these were aliphatic hydrocarbons having 6 to 8 carbon atoms) were contained in a proportion of 59 mol % (calculated as methane) based on the total. The remainder were hydrocarbons having 1 to 4 carbon atoms. CO (carbon monoxide) in the gas was not detected (5 ppm or less). The content of $CO_2$ was 10 ppm.

The above findings show that the catalyst 1 of the present invention has the function of catalytically cracking the flux components to convert them into light hydrocarbons.

Examples 2 to 8

Flux Cracking Rate and Amounts of CO, Etc.:

The apparatus of FIG. 2 was charged with each of the catalysts, and the catalytic cracking reaction of the flux components was repeatedly performed through 10 cycles under the aforementioned conditions. After each cycle, the composition of the cracked gas B (CO, $CO_2$ and THC) and the carbon content in the catching filter were measured. The THC (total hydrocarbons) means the whole of light hydrocarbons in the cracked gas B that were detected under the aforementioned gas chromatography conditions.

The flux cracking rate was determined by Equation 1 indicated below. As clear from Equation 1, the catalyst having a high flux cracking rate involves a smaller C content of the uncracked flux. This means that contamination in the actual reflow furnace is prevented.

$$\text{Flux cracking rate (wt. \%)} = \{1-(\text{C content of uncracked flux})/(\text{total C content of cracked gas})\} \times 100 \quad \text{[Equation 1]}$$

In this equation, the term "C content of uncracked flux" refers to the amount of carbon ascribed to the uncracked flux contained in the cracked gas A generated in the one cycle of catalytic cracking operation, and this amount is a value calculated from the carbon content in the catching filter. The term "total C content of cracked gas" refers to the total weight which is the sum of the amount of carbon ascribed to each of CO, $CO_2$ and THC, and the C content of the uncracked flux, in the cracked gas A generated in the one cycle of catalytic cracking operation.

Of the results of the 10-cycle operations using each catalyst, the results of the 8 to 10 cycles were averaged to obtain the flux cracking rate and the concentrations of THC, CO and $CO_2$ in the cracked gas B (ppm by weight calculated as carbon content). These data are shown in Table 1. Comparative Example 3 in Table 1 corresponds to the results obtained when catalytic cracking was performed under the same conditions, except that only the honeycomb material (cordierite) free from the catalytic component was charged.

[Table 1]

TABLE 1

|  |  | Flux cracking rate (%) | Concentration in cracked gas B (calculated as C, ppm by weight) | | |
|---|---|---|---|---|---|
|  |  |  | THC | CO | $CO_2$ |
| Ex. 2 | Catalyst 1: H—Y (100) | 62 | 230 | 0 | 10 |
| Ex. 3 | Catalyst 2: ZSM5 (100) | 66 | 240 | 0 | 10 |
| Ex. 4 | Catalyst 3: β type zeolite (100) | 70 | 250 | 0 | 10 |
| Ex. 5 | Catalyst 4: H—Y (50) + $Al_2O_3$ (50) | 67 | 190 | 0 | 13 |
| Ex. 6 | Catalyst 5: H—Y (50) + Pt/$Al_2O_3$ (50) | 81 | 160 | 5 | 130 |
| Ex. 7 | Catalyst 6: H—Y (80) + Pt/$Al_2O_3$ (20) | 83 | 200 | 5 | 115 |
| Ex. 8 | Catalyst 7: Pt/ZSM5 (100) | 80 | 140 | 5 | 130 |
| Ex. 9 | Catalyst 8: H—Y (50) + Pt/$Al_2O_3$ (50) + K (5) | 85 | 130 | 2 | 150 |
| Comp. Ex. 1 | Catalyst A: Pt/$Al_2O_3$ (100) | 66 | 110 | 15 | 125 |
| Comp. Ex. 2 | Catalyst B: $Al_2O_3$ (100) | 34 | 60 | 0 | 11 |
| Comp. Ex. 3 | No catalyst: carrier (cordierite) | 0 | 1 | 0 | 5 |

Table 1 shows that the catalysts 1 to 7 of the present invention (Examples 2 to 8) cracked the flux components at cracking rates of 62% to 83% at a temperature of 250° C., with the amounts of CO generated being 0 to 5 ppm. Of these catalysts, the catalysts 6 and 7 achieved the flux cracking rates of as high as about 80% while generating 5 ppm of CO.

With the catalyst 8 (Example 9) having K added to the catalyst 5, the cracking rate of the flux components increased to 85%, the generation of CO was suppressed, and the rate of conversion into $CO_2$ also became high.

With the catalyst A of Comparative Example 1, on the other hand, the cracking rate was 66%, but the amount of CO generated was as large as 15 ppm in comparison with the catalyst 1.

These results are presumed to show the following facts: The catalyst A oxidizes the flux components to produce large amounts of CO and $CO_2$. On the other hand, the catalysts of the present invention have zeolite catalytically crack the flux components to convert them into a light hydrocarbon (THC). When a precious metal is incorporated together with zeolite, the resulting light hydrocarbon (THC) can easily turn into $CO_2$.

As noted above, the purification catalysts of the present invention crack the flux components at the soldering temperature and in an inert gas atmosphere to convert them into light hydrocarbons. Thus, these catalysts are found to decrease contamination within the furnace due to flux and produce very small amounts of CO.

Example 9

Figure 4:
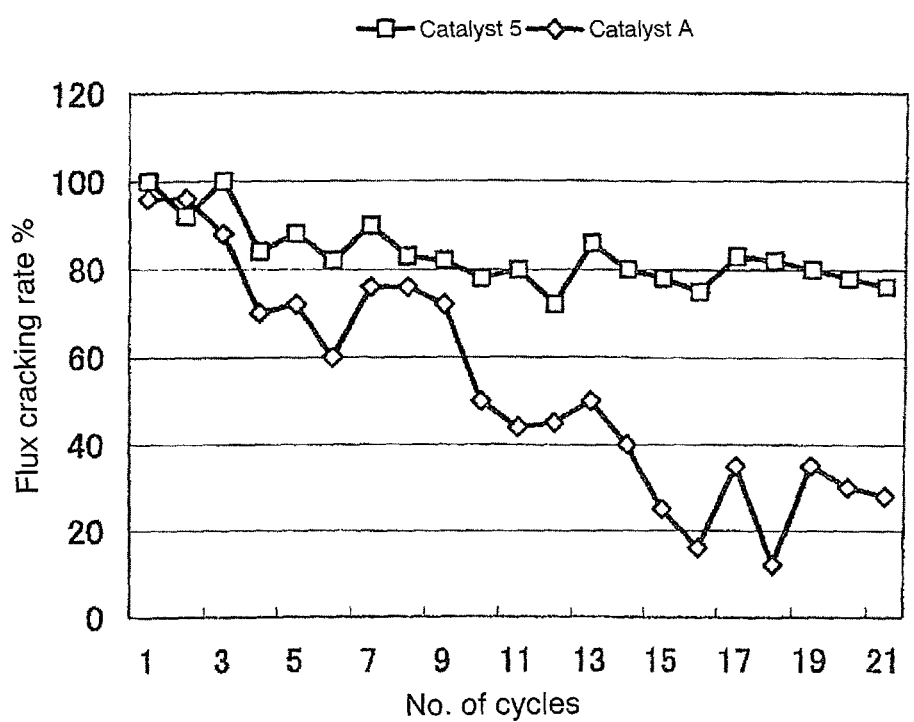
FIG. 4 is a chart showing changes in the flux decomposition rates with respect to the numbers of cycles performed on a catalyst 7 and the catalyst A.
Figure 5:
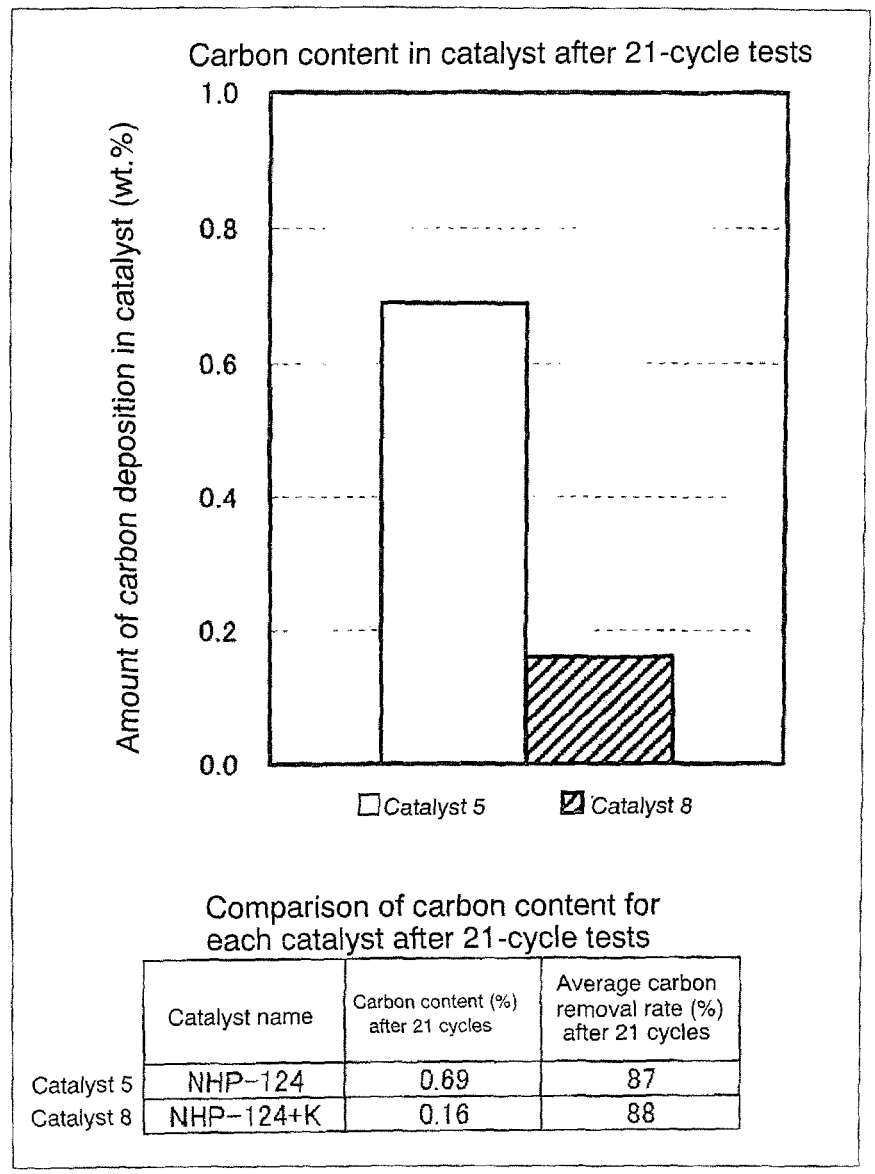
FIG. 5 is a graph and a table showing the amounts of carbon deposition in the catalysts after 21-cycle tests.

Results of 21-Cycle Tests:

Changes in the flux cracking rates in 21-cycle tests using the catalyst 5 and the catalyst A are shown in FIG. 4. The amounts of carbon deposition in the catalyst after the 21-cycle tests using the catalyst 5 and the catalyst 8 are shown in FIG. 5.

As shown in FIG. 4, the flux cracking activity of the catalyst A declined as the number of the cycles increased, whereas the catalyst 5 had persistent high cracking activity. In the catalytic cracking reaction, coky hydrocarbons form in zeolite, and they are presumed to be oxidized with the precious metal, thereby curtailing a decline in the activity. As shown in FIG. 5, the amount of carbon deposition in the catalyst was smaller with the catalyst 8 than with the catalyst 5. Thus, the catalyst 8 is clearly found to have the effect of effectively removing coky hydrocarbons generated by catalytic cracking, and persisting in the catalytic activity.

The invention claimed is:

1. A purification catalyst for a reflow furnace gas, containing:
   a component A: zeolite; and
   a component B: one or more compounds selected from a group of inorganic oxides consisting of alumina, silica gel, and titania, at a component A: component B weight ratio of 99:1 to 10:90;
   a component C: at least one precious metal in a proportion of 10 ppm by weight to 2% by weight based on a total weight of the component A and the component B; and
   a component D: at least one alkali metal in a proportion of 1 to 10% by weight based on a total weight of the component A, wherein component D is present on component B.

2. The purification catalyst for a reflow furnace gas according to claim 1, wherein the component A: component B weight ratio is 90:10 to 20:80.

3. The purification catalyst for a reflow furnace gas according to claim 1, wherein the component B comprises particles having the at least one precious metal carried thereon.

4. The purification catalyst for a reflow furnace gas according to claim 2, wherein the component B comprises particles having the at least one precious metal carried thereon.

5. The purification catalyst for a reflow furnace gas according to claim 1, wherein the at least one alkali metal is present in a proportion of 2 to 8% by weight of the alkali metal based on a total weight of the component A.

6. The purification catalyst for a reflow furnace gas according to claim 1, wherein the at least one alkali metal is present in a proportion of 3 to 6% by weight of the alkali metal based on a total weight of the component A.

7. The purification catalyst for a reflow furnace gas according to claim 1, wherein the at least one alkali metal is sodium.

8. The purification catalyst for a reflow furnace gas according to claim 1, wherein the at least one alkali metal is selected from the group consisting of sodium and potassium.

9. A purification catalyst for a reflow furnace gas, containing:
   a component A: zeolite; and
   a component B: one or more compounds selected from a group of inorganic oxides consisting of alumina, silica gel, and titania, at a component A: component B weight ratio of 99:1 to 10:90;
   a component C: at least one precious metal in a proportion of 10 ppm by weight to 2% by weight based on a total weight of the component A and the component B; and
   a component D: potassium in a proportion of 1 to 10% by weight based on a total weight of the component A, wherein component D is present on component B.

10. The purification catalyst for a reflow furnace gas according to claim 9, wherein the component A: component B weight ratio is 90:10 to 20:80.

11. The purification catalyst for a reflow furnace gas according to claim 9, wherein the component B comprises particles having the at least one precious metal carried thereon.

12. The purification catalyst for a reflow furnace gas according to claim 10, wherein the component B comprises particles having the at least one precious metal carried thereon.

13. The purification catalyst for a reflow furnace gas according to claim 9, wherein the potassium is present in a proportion of 2 to 8% by weight of the potassium based on a total weight of the component A.

14. The purification catalyst for a reflow furnace gas according to claim 9, wherein the potassium is present in a proportion of 3 to 6% by weight of the potassium based on a total weight of the component A.

15. The purification catalyst for a reflow furnace gas according to claim 1, wherein component A is selected from the group consisting of Y type zeolite, MFI type zeolite, β type zeolite, and mordenite.

16. The purification catalyst for a reflow furnace gas according to claim 1, wherein component C is selected from the group consisting of platinum, palladium, rhodium, iridium, and ruthenium.

17. The purification catalyst for a reflow furnace gas according to claim 9, wherein component A is selected from the group consisting of Y type zeolite, MFI type zeolite, β type zeolite, and mordenite.

18. The purification catalyst for a reflow furnace gas according to claim 9, wherein component C is selected from the group consisting of platinum, palladium, rhodium, iridium, and ruthenium.

* * * * *